Patented June 4, 1929.

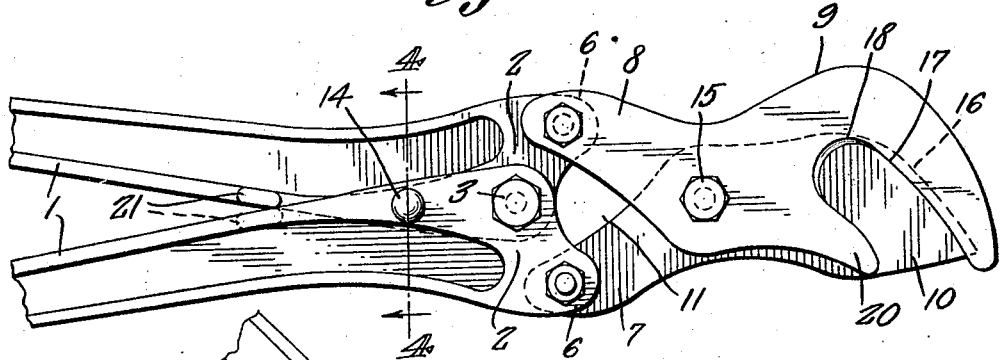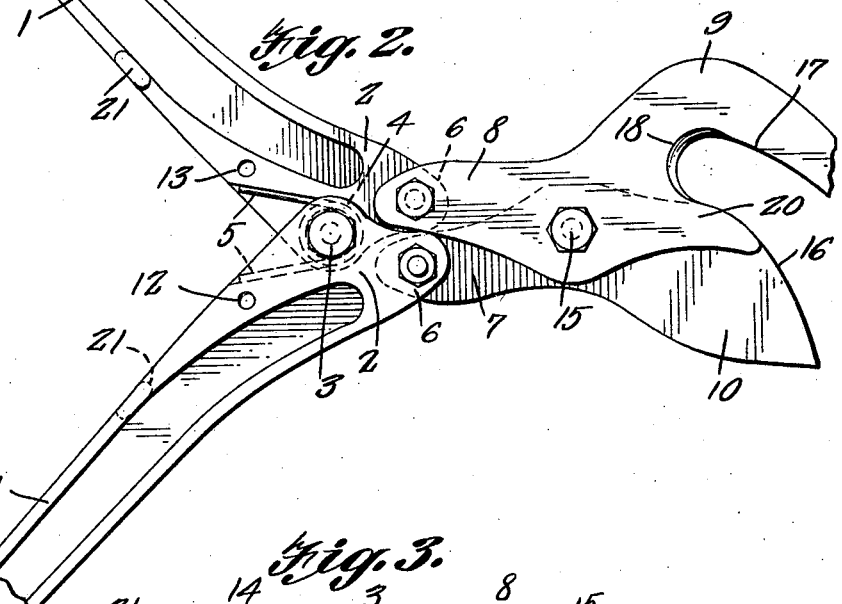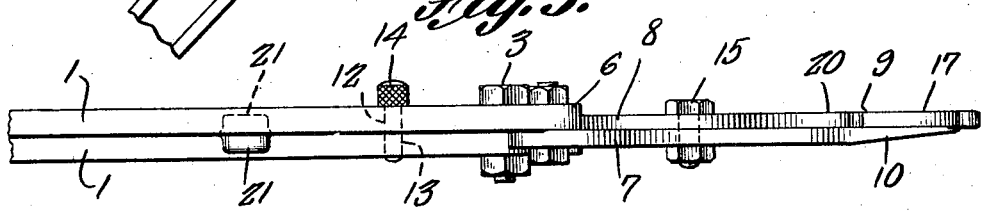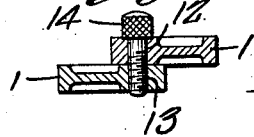

1,716,257

UNITED STATES PATENT OFFICE.

FREDERICK H. BLODGETT, OF BELLOWS FALLS, VERMONT.

PRUNING SHEARS.

Application filed April 20, 1928. Serial No. 271,571.

My present invention has reference to a new and improved pruning shears, and among my objects is the provision of a pair of shears for this purpose in which the jaws are so constructed and arranged with respect to the handles as to insure the cutting operation with the minimum amount of pressure against the handles; to provide the handles with spring means for normally swinging the same away from each other to bring the jaws to open position, but wherein the spring means are effectively housed and protected; to construct the jaws in such manner that one of the said jaws serves as a bark impinging and limb holding blade, while the second jaw serves as the cutting blade; to construct one of the jaws in a manner whereby the limb or bough of a tree or shrubbery is effectively guided for cutting between both of the jaws to insure a shearing cut against such bough or limb; wherein the bough or limb guiding element serves as a means for preventing the cutting edges of the jaws contacting with each other and thus impairing the use of the improvement, wherein means is provided for limiting the movement of the jaws in both directions, and further wherein means is provided for latching the device when the jaws are closed.

To the attainment of the foregoing and other objects which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a plan view of the improvement, showing the handles locked to prevent the outward spreading thereof.

Figure 2 is a similar view with the handles spread and the jaws in open position.

Figure 3 is an edge view of the improvement.

Figure 4 is a sectional view on the line 4—4 of Figure 1.

The handles 1—1 of the improvement are arched or curved away from each other, but have reduced portions which are arranged in lapping relation and which portions 2—2, are connected by a removable pivot 3. Received in circular depressions in the confronting faces of the parts 2 of the handles there is the coil portion 4 of a spring, the arms of the spring being received in notches 5 in the respective portions 2 of the handles, the notches being directed toward the handles. In this manner it will be seen that the spring is effectively housed but influences the handles away from each other. Each of the parts 2 of the handles 1 has its outer edge formed with a reduced extension 6 and to these extensions 6 there are pivoted the reduced portions or shanks 7 and 8 of the cutting jaws 9 and 10, respectively. By reference to Fig. 2 of the drawings, it will be seen that the inner and straight edges of the shanks 7 and 8 contact respectively with one of the inner edges of the reduced extension 6 on the body portions 2 of the handles 1 and thereby limit the swinging of the handles away from each other when the jaws are swung to their full open position. By reference to Figure 1 it will be seen that when the handles are swung to close the jaws a space 11 is provided between the inner edges of the jaw body extensions 6 and the shanks 7 and 8 and this space may have passed therethrough a hook that is attached to the belt of the user of the shears. The body 2 of one of the handles 1 has an opening 12 therein designed to aline with a notch or opening 13 in the body 2 of the second handle 1, when the handles are swung together, and there is passed through the opening 12 and received in the notch or opening 13 the shank of a pin 14 which, of course, locks the handles and jaws in closed positions.

Preferably the pivot bolts above described have only the outer portions of the shanks threaded and these threaded portions engage the threaded openings in one of the elements through which they pass, the said pivots having screwed on their outer ends locking nuts.

The shanks 7 and 8, of the respective jaws 9 and 10 have their inner edges approximately centrally widened and overlapping and these portions are pivotally connected, as at 15. The jaw 10 has its active edge struck at a curvature, as at 16, and this edge is sharpened throughout the length thereof. The jaw 9 is in the nature of a hook-shaped member, the inner rounded portion of which, indicated for distinction by the numeral 17, only is sharpened. From its rounded or concaved and sharpened portion 17 the jaw 9 is extended to provide a finger 20. The finger 20 has its inner or active edge shaped to correspond to the shape of the cutting edge 16 of the jaw 10. The finger 20 provides an important element of this improvement. When the jaws are swung to open position, as disclosed by Figure 2 of the drawings, it will be seen that the inner rounded edge of the finger 20 is disposed in a line with or slightly beyond the cutting edge 16 of the jaw 10. Also as stated, only the inner rounded or concaved portion 17 of the jaw 9 is sharpened. The finger 20 serves two important purposes. In the first place the said finger is at all times disposed over and glides against the inner flat face of the jaw 10 and, therefore, prevents the cutting edge of the said jaw 10 being brought against or into contact with the cutting surface of the hooked jaw 9.

In the second place the finger 20 serves as a means for guiding the limb to be cut against the jaw 10. The contact of the finger with the limb holds the same and causes the said limb to curve when the jaws are swung together. The cutting surface of the jaw 9 cuts into the bark of the limb and impinges the said limb, permitting the jaw or blade 10 to entirely sever the limb. In order that no injury be inflicted the handles 1 when swung against each other I pocket in the confronting edges of the handles cushioning contact blocks 21. These blocks may be of metal and may have their active faces filed or otherwise cut away to insure the contact thereof when the size of the jaws are reduced in the sharpening thereof.

With my improvement it will be noted that a great amount of leverage will be obtained by the operator grasping the handles 1 so that foliage may be pruned in an easy and expeditious manner with the minimum amount of physical exertion upon the part of the operator.

Having described the invention, I claim:

1. A pruning shears comprising a pair of curved handles having flattened and reduced body portions which are arranged in lapping relation and which are pivotally connected, spring means received in the body portions for influencing the handles away from each other, each of said bodies having a reduced extension in a line with its outer edge, jaws having shanks which are pivoted to the said extensions and the inner edges of the said shanks designed to contact with the respective extensions when the jaws are opened for limiting the opening of the jaws and outward swinging of the handles, said shanks having lapping body portions which are pivotally connected, the jaw on the outer end of one of the handles having its active edge struck at an outward curvature and sharpened throughout the length thereof and the jaw of the second shank having an outer hooked portion whose inner end is concaved and sharpened and which is from thence formed with an outwardly projected finger whose inner edge is shaped to correspond with the curvature of the active edge of the first mentioned jaw.

2. A pruning shears comprising a pair of curved handles, having flattened and reduced body portions which are arranged in lapping relation and which are pivotally connected, spring means concealed in the body portions for influencing the handles away from each other, each of said bodies having a reduced extension in a line with its outer edge, jaws having shanks which are pivoted to the said extensions and the inner edges of the said shanks designed to contact with the respective extensions when the jaws are opened for limiting the opening of the jaws and outward swinging of the handles, said shanks having lapping body portions which are pivotally connected, the jaw on the outer end of one of the handles having its active edge struck at an outward curvature and sharpened throughout the length thereof and the jaw of the second shank having an outer hooked portion whose active edge is sharpened for a determined point from its end to adjacent its juncture with the shank and from thence formed with an inwardly rounded straight portion that merges into an outwardly projected finger whose edge is curved to correspond with the curvature of the active edge of the first mentioned jaw, and removable means for locking the handles and jaws in closed position.

FREDERICK H. BLODGETT.